Figure 1:
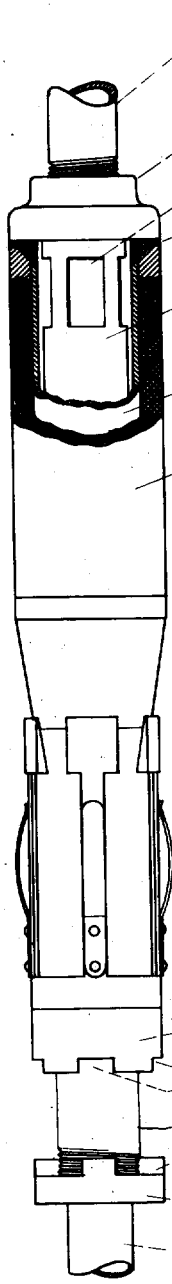

G. F. HOVIS.

WATER DISCHARGE ATTACHMENT FOR DEEP WELL PACKERS.

APPLICATION FILED JAN. 25, 1912.

Reissued Aug. 13, 1912. 13,457.

Witnesses
Ruth C. Fitzhugh
Jamerett Anderson

Inventor
George F. Hovis,
By Mauro, Cameron, Lewis & Massie
Attorneys

UNITED STATES PATENT OFFICE.

GEORGE F. HOVIS, OF CLINTONVILLE, PENNSYLVANIA.

WATER-DISCHARGE ATTACHMENT FOR DEEP-WELL PACKERS.

13,457. Specification of Reissued Letters Patent. Reissued Aug. 13, 1912.

Original No. 997,915, dated July 11, 1911, Serial No. 595,726. Application for reissue filed January 25, 1912. Serial No. 673,490.

*To all whom it may concern:*

Be it known that I, GEORGE F. HOVIS, of Clintonville, in the county of Venango and State of Pennsylvania, have invented a new and useful Improvement in Water-Discharge Attachments for Deep-Well Packers, which invention is fully set forth in the following specification.

This invention relates to packers for deep wells such, for example, as oil wells, and to attachments in connection therewith.

In the operation of deep wells such as oil wells, it becomes necessary, as is well known, to place a packer in the well at a proper point in order to shut off the water from the upper levels and prevent it from descending to the lower levels of the well, and in placing such packers in positon in the well, it is the ordinary practice to connect them to the tubing as the latter is placed in the well, so that they will occupy the position at the desired level when the tubing is in place. In the subsequent operations of the well, it sometimes becomes necessary or desirable to withdraw the tubing from the well, and since the packers as heretofore constructed have been so connected to the tubing that they can not be disconnected therefrom when once placed in position in the well, it is necessary if the tubing is to be removed to remove the packer therewith. In some cases, this can be done and in others it cannot be done, because where the packer has remained undisturbed in the well for a considerable period of time, it may become permanently set and adhere so firmly to the walls of the well that it cannot be removed.

The object of the present invention is to provide a packer and means of attaching the same to the tubing which will enable the operator to remove the tubing and the packing, where the packing has not become permanently set in the well, or, in case it has become so permanently set, to enable the tubing to be disconnected from the packer while in position in the well, to the end that the tubing with its connected parts may be withdrawn through the packer, and removed from the well while leaving the packer in position in the well to receive the tubing when the latter is reinserted.

When the packer is to be removed with the tubing, the weight of the superimposed water which it is the function of the packer to restrain and prevent from reaching the lower levels of the well, itself presents an additional difficulty in the removal of the packer, and one object of the invention is to provide means, when the packer is to be removed with the tubing, for permitting the superimposed water to pass the packer or escape from above the same, so that in the removal of the tubing and packing the weight of the water will not have to be overcome.

I accomplish the objects above set forth by providing any suitable packer with proper connections with the tubing for positioning it at the desired point in the well, which connections are of such a character that the tubing may be operated at the surface for disconnecting it from the packer and the tubing removed without the packer; furthermore, I provide an attachment whereby (if the packer is to be removed with the tubing,) ports or openings which are normally closed during the operation of the well, may be opened for the passage of the water past the packer when the tubing is raised for the purpose of withdrawal.

Another feature of my attachment is the provision of means whereby, when the tubing has been removed and the packer is left in position, a water-tight joint may be formed between the tubing and the packer when the tubing is returned to position.

My improvements may be adapted to be applied to many of the various forms of packers now upon the market, such, for instance, as that shown in Letters-Patent to D. W. Black, N°. 439,233 of Oct. 28, 1890, that to D. W. Black, N°. 588,384, of Aug. 17th, 1897, or that to B. Masseth, N°. 439,166, of Oct. 28, 1890, and several others.

Figure 2:
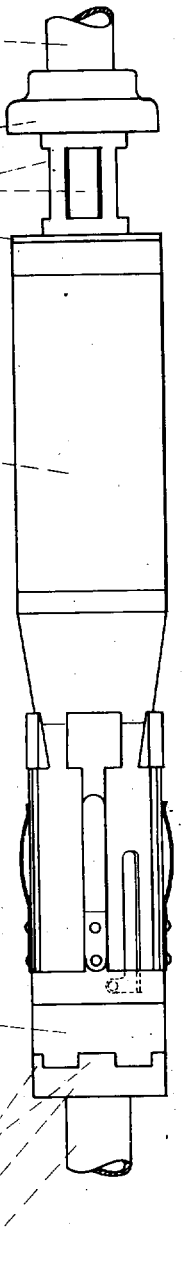
Figure 3:
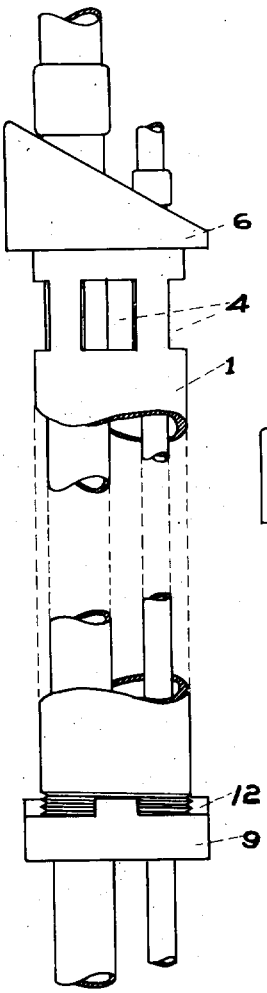
Figure 4:
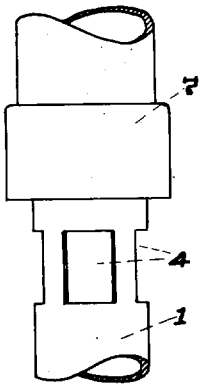

In the drawing, Figure 1 illustrates one of the various forms of packers with my improvements applied thereto, parts being broken away to disclose the construction; Fig. 2 is a side elevation showing the parts in the position they occupy when the well tubing is raised above the position shown in Fig. 1; and Figs. 3 and 4 illustrate modifications.

Referring to the drawings, 1 indicates a water-discharge pipe surrounding the well tubing or pipe 13, said water discharge pipe 1 being inserted within and projecting below the bottom of the packer for a short distance. The external diameter of the well tubing or pipe 13 is somewhat less than the internal diameter of the water-discharge pipe 1, as shown, and the external diameter of pipe 1 is somewhat less than the internal diameter of the packer-sleeve 3, so that it may have a free longitudinal movement in the packer-sleeve.

Approximate to the upper end of the discharge-pipe, ports 4 are formed, through which water may pass to the interior of pipe 1, and through the same to the space below the packer, thereby relieving the weight upon the packer. The upper end of the discharge-pipe 1 may be adapted for the attachment of any desired fitting, such as a tubing-coupling 5, as shown in Figs. 1 and 2, or a tubing and gas-escape pipe-fitting 6, as shown in Fig. 3, or a casing-collar 7, as shown in Fig. 4. Between the lower face of the coupling 5, 6 or 7, as the case may be, and the upper juxtaposed face of the packer, is interposed a packing-ring 8, which serves to form a tight joint at this point.

It often become desirable, for the purpose of effecting repairs or for other reasons, to pull the tubing 13 and the casing and the thereto attached packer from the well, but with the usual form of packer, this is often very difficult, owing to the fact that there is no way of relieving the packer from the weight of the superimposed body of water, but with my improved attachment the discharge pipe 1 may be raised, through the medium of the pipe or tubing 13, and the water resting upon the packer is thereby permitted to flow down through the packer, between the pipes 1 and 13, thus relieving the packer of all weight. Upon the lower end of the discharge pipe 1 is affixed a collar 9, which, when said discharge pipe is raised, abuts against the lower end of the packer and sustains the weight thereof and carries said packer upward with the tubing or casing as it is being withdrawn from the well. In cases, however, where the packer has remained undisturbed in the well for a considerable period of time, it may have become permanently set, and thus adheres so firmly to the wall of the well that it cannot be removed, and in this event it becomes necessary to allow the packer to remain in the well; hence, some provision must be made for permitting the withdrawal of the pipe from the packer. I make provision for such withdrawal in the following manner: In the lower face of the collar 10 of the packer, I form several notches 11, and in the upper face of the collar 9, I form a corresponding number of lugs 12, adapted to enter and be engaged by said notches. Collar 9 is secured to pipe 1 by a left-hand screw-thread. When it is found that the packer has become permanently set and stuck in the well, pipe 1 may be unscrewed from the collar 9 by raising pipes 1 and 13, thereby causing the inter-engagement of the collar 9 with the lower end of the packer, as shown in Fig. 2. This prevents said collar from turning and when said pipe 1 is turned, it unscrews from said collar, and may then be freely withdrawn from the packer. All of the threads by means of which the tubing or casing is secured together are right-hand threads, which insures the unscrewing of the collar 9 from pipe 1, as above stated. It is apparent that the packing-ring 8 performs its function of forming a water-tight joint both before the tubing has been withdrawn from the well and after it has been withdrawn and reinserted.

I claim:—

1. In a well, a packer, a pipe extending longitudinally through said packer, a device connected to said pipe and engaging said packer and preventing the upward withdrawal of the pipe from the packer, and means operable to disengage said device from said pipe to permit the withdrawal of the pipe from the packer.

2. In a well, a packer, a pipe passing longitudinally through said packer and removable therefrom while the packer is in the well, a projection provided on said pipe engaging the upper end of said packer and forming a water-tight joint between said packer and said pipe, whereby said pipe may be withdrawn from the packer and reinserted water-tight therein.

3. In a well, a packer, a pipe extending longitudinally through said packer, means attached to said pipe resting upon and forming a water-tight joint with the upper end of said packer, a device connected to said pipe and engaging said packer and preventing the upward withdrawal of the pipe from the packer, and means operable to disengage said device from said pipe, to permit the withdrawal of the pipe from the packer.

4. In a well, a packer, a pipe extending longitudinally through said packer, means attached to said pipe seating upon and automatically forming a water-tight joint with the upper end of said packer, a device connected to said pipe and engaging said packer and preventing the upward withdrawal of the pipe from the packer, and means operable to disengage said device from said pipe to permit the withdrawal of the pipe from the packer.

5. In a well, a packer, a removable and reinsertible pipe extending longitudinally through said packer, means attached to said pipe seating upon and automatically forming and reforming a water-tight joint with the upper end of said packer, at the initial and subsequent insertion of said pipe, a device connected to said pipe and engaging said packer and preventing the upward withdrawal of the pipe from the packer, and means operable to disengage said device from said pipe, to permit withdrawals of the pipe from the packer.

6. In a well, a packer, a pipe having a limited longitudinal movement through said packer, a device removably secured to one of said parts and limiting the upward movement of the pipe through the packer, and means operable to disconnect said device from said part to permit the full upward movement of the pipe through the packer and its withdrawal therefrom.

7. In a well, a pipe, a packer surrounding and connected to said pipe, and means operable by the movement of said pipe to disconnect the packer from the pipe and permit the withdrawal of the pipe from the well without the packer.

8. In a well, a pipe, a packer surrounding said pipe, means limiting the longitudinal movement of the pipe through said packer, and devices operable by the movements of the pipe to free the pipe from said limiting means and permit the upward withdrawal of said pipe through the packer.

9. In a well, a packer, a pipe passing longitudinally through said packer, a collar screw-threaded on said pipe and limiting the upward movement of the pipe through said packer, and means restraining said collar from turning movement, whereby the collar may be unscrewed from the pipe by turning the latter, thereby permitting the pipe to be withdrawn from the packer.

10. The combination with a packer for deep wells, of a pipe having ports in the upper end thereof, said pipe extending through and longitudinally movable within the packer for the purpose set forth, a tubing connection upon the upper end of said pipe, a packing ring interposed between the opposing faces of said connection and said packer, a collar screw-threaded to the lower end of said pipe and means for causing the inter-engagement between said collar and the lower end of said packer for the purpose of effecting the removal of said collar from said pipe to permit the withdrawal of said pipe from said packer.

11. A water-discharge attachment for packers for deep wells consisting, in combination with such packer, of a water-discharge pipe passing through and longitudinally movable in said packer and having water-discharge ports therein arranged to be withdrawn from and positioned above the top of said packer for the purpose of permitting the downward flow of water through said ports, a suitable pipe connection secured to the upper end of said pipe and adapted to seat upon the upper end of said packer, a packing ring interposed between the opposing faces of said connection and said packer, a collar screw-threaded to the lower end of said pipe, and means for effecting a non-revoluble engagement between said collar and the lower end of said packer for the purpose of effecting the removal of said collar from said pipe.

In testimony whereof I have signed this specification in the presence of two subscribing witnesses.

GEORGE F. HOVIS.

Witnesses:
Wm. B. Griffen,
A. J. Sibley.